United States Patent [19]

Elliott et al.

[11] Patent Number: 4,692,918
[45] Date of Patent: Sep. 8, 1987

[54] RELIABLE LOCAL DATA NETWORK ARRANGEMENT

[75] Inventors: Roger A. Elliott, Naperville; Wayne V. Lindquist, Lisle, both of Ill.

[73] Assignee: AT&T Bell Laboratories, Murray Hill, N.J.

[21] Appl. No.: 682,096

[22] Filed: Dec. 17, 1984

[51] Int. Cl.[4] .............................................. H04J 3/02
[52] U.S. Cl. ..................................... 370/85; 370/16; 370/94
[58] Field of Search ................... 370/85, 89, 94, 16; 340/825.5

[56] References Cited

U.S. PATENT DOCUMENTS

| | | | |
|---|---|---|---|
| 4,063,220 | 12/1984 | Metcalfe et al. | 340/147 |
| 4,408,300 | 10/1983 | Shima | 370/85 |
| 4,464,658 | 8/1984 | Thelen | 340/825.5 |
| 4,532,626 | 7/1985 | Flores et al. | 370/85 |
| 4,543,629 | 9/1985 | Carey et al. | 370/85 |
| 4,554,656 | 11/1985 | Budrikis et al. | 370/85 |
| 4,562,573 | 12/1985 | Murano et al. | 370/85 |

OTHER PUBLICATIONS

J. B. Connell et al.: "No. 1 ESS Bus System, *Bell System Technical Journal*, vol. 43, No. 5, Part 1, Sep. 1964, pp. 2021-2054.
T-S. Liu, "Maintenance Processors for Mainframe Computers," *IEEE Spectrum*, vol. 21, No. 2, Feb. 1984, pp. 36-42.
"*The Ethernet: A Local Area Network*", Digital, Intel and Xerox Corporatons, Version 1.0, Sep. 30, 1980.

*Primary Examiner*—Douglas W. Olms
*Assistant Examiner*—Kenneth I. Rokoff
*Attorney, Agent, or Firm*—Werner Ulrich; Peter Visserman

[57] ABSTRACT

The reliability of a distributed processing system is enhanced through the use of a highly reliable data communication system. Each node of such a system is connected to the other nodes by a local data network, including duplicated data network media, such as coaxial cables. Each node includes a maintenance processor for controlling which of the duplicate network media is active and which is standby. Regular inter-node data packets are transmitted over the active network medium. Control data packets to the maintenance processor are sent from a control node over the standby network medium. The maintenance processor can also totally stop transmission of data from the associated node to both data network media.

28 Claims, 8 Drawing Figures

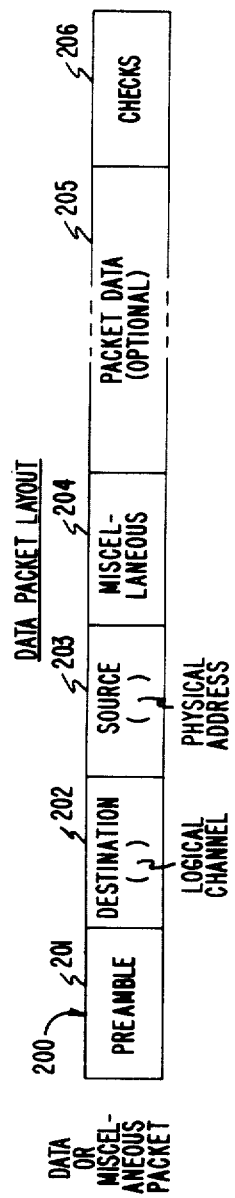
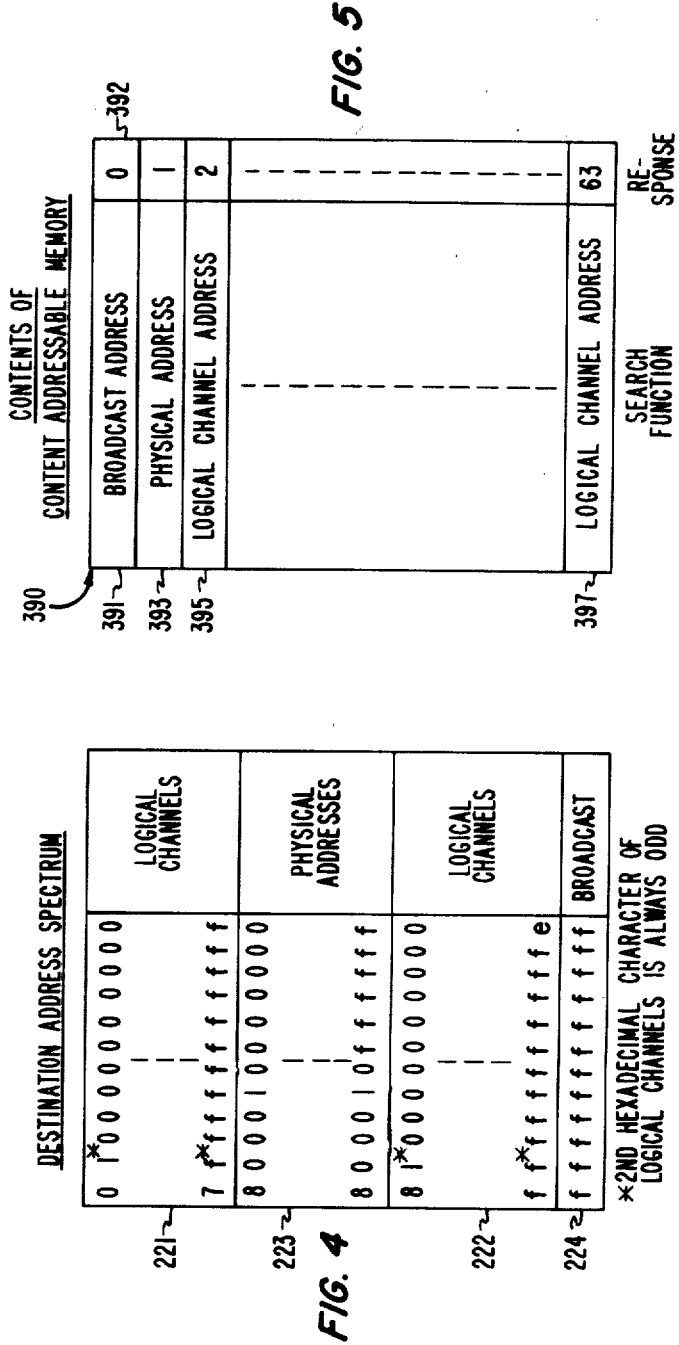

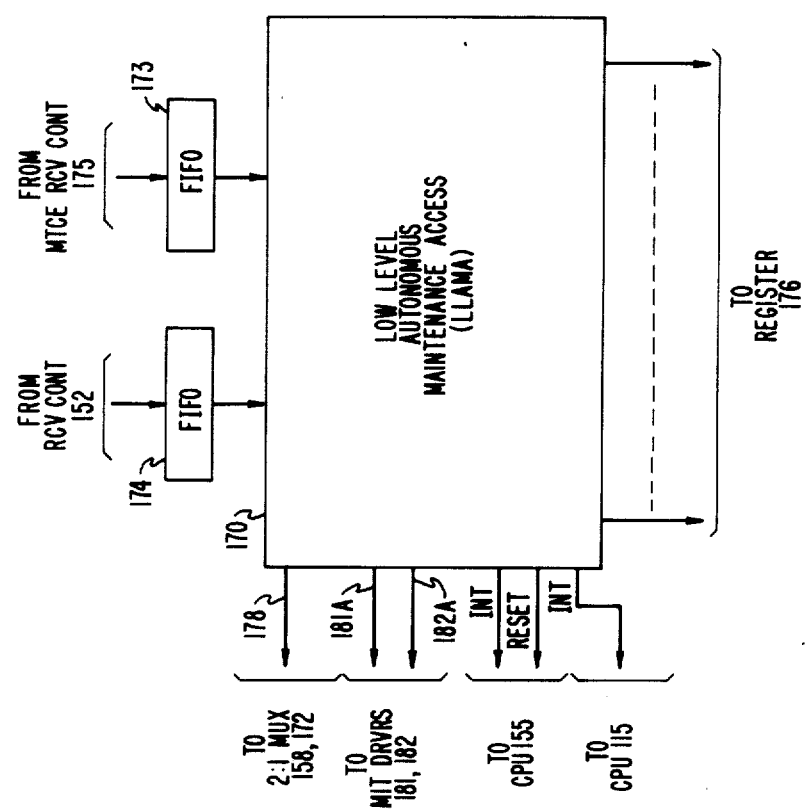

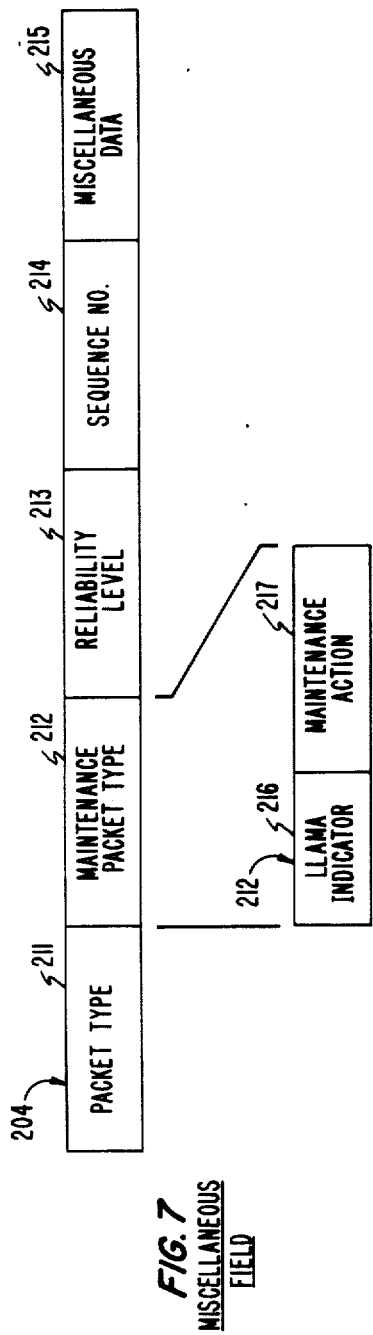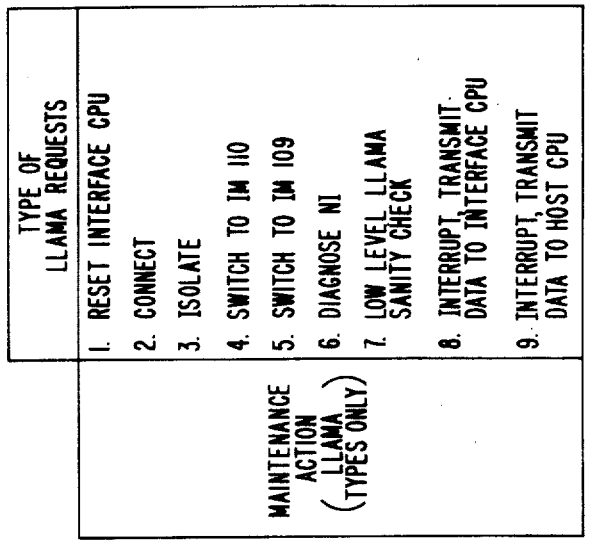

RELIABLE LOCAL DATA NETWORK ARRANGEMENT

TECHNICAL FIELD

This invention relates to data communications, and, more specifically, to reliable data communications among data processors interconnected by a local data network.

BACKGROUND OF THE INVENTION

In a distributed processing system, a number of processors cooperate to perform the basic functions required of the system. The processors are arranged in complexes, each of which includes one or more processors. Cooperation among these processor complexes is made possible by providing facilities to permit these processor complexes to send data messages, each consisting of one or more packets of data, to each other. A local data network is one common way of interconnecting such processor complexes in order to allow free exchange of data packets among arbitrary ones of the processor complexes in the distributed processing system. The ETHERNET ® system is one common type of local data network used for permitting the processor complexes of a distributed processing system to communicate with each other.

A major objective of a distributed processing system is greater reliability of the system. These systems are frequently arranged so that no one processor or processor complex is critical to the operation of the system; functions can be flexibly assigned so that if one processor fails, other processors may take over its work. In order to have a reliable system however, the communication arrangement between processor complexes must be equally reliable. The known communication arrangements have facilities for insuring a substantial level of reliability. A coaxial cable is commonly used as the communication medium between the processor complexes. The interface circuits between a processor complex and the coaxial cable are designed so that faulty circuitry is unlikely to place a short circuit across the communication medium. It is more difficult, however, to protect against the problem of "babbling buses" in which a faulty processor complex continuously transmits data bits to the communication medium so that no other processor complex can transmit information over the medium. Further, a fault in the coaxial cable would render such a communication system totally ineffective. In such a system it is also difficult to protect against the situation in which one of the processor complexes generates an unduly large volume of data packets thereby precluding other processor complexes from normal use of the bus. Growth in a system which must maintain continuous service also presents difficulties. A problem therefore exists in the prior art in that a very high reliability local data network has not been achieved.

SUMMARY OF THE INVENTION

In accordance with our invention, duplicate data network transmission media are provided for access by each processor complex of a distributed processing system; in the normal configuration, data packets are transmitted over an active medium, while control packets are transmitted over a standby medium. A maintenance processor, provided for each network interface attached to the media, receives and responds to control packets. Each maintenance processor has the ability to designate either medium as active for its associated network interface and to shut off transmission from the network interface and processor complex with which it is associated.

In accordance with one embodiment of the invention, a network interface is connected to the duplicate transmission media and to the processor complex, thus forming a node of the network. The network interface includes an interface processor for controlling transmission of data to and reception of data from the duplex transmission media, and a maintenance processor which receives control communications from the standby transmission medium. If the standby transmission medium is out of service, the maintenance processor receives control communications over the active medium. The maintenance processor responds to orders to inhibit transmission from the network interface to both media, to connect the network interface to either of the two media, and to restore the ability of the network interface to transmit on the active medium. The orders to the maintenance processors are generated by one processor complex at a control node of the network. The control node monitors the performance of the distributed processing system, periodically checks the ability of the maintenance processors to respond to control packets, and sends control packets to the maintenance processors to isolate faulty nodes.

BRIEF DESCRIPTION OF THE DRAWING

The invention may be better understood with reference to the following description taken in conjunction with the drawing, in which:

FIGS. 3 and 7 illustrate the format of data packets transmitted over the data network transmission media of FIG. 1;

FIG. 4 specifies the use of the address spectrum of destination addresses for data packets transmitted over the data network transmission media;

FIG. 5 shows the layout of a content addressable memory used for identifying packet destination addresses;

FIG. 6 represents the output signals of a maintenance processor for one node of such a system; and FIG. 8 lists commands to such a maintenance processor.

DETAILED DESCRIPTION

Figure 1:
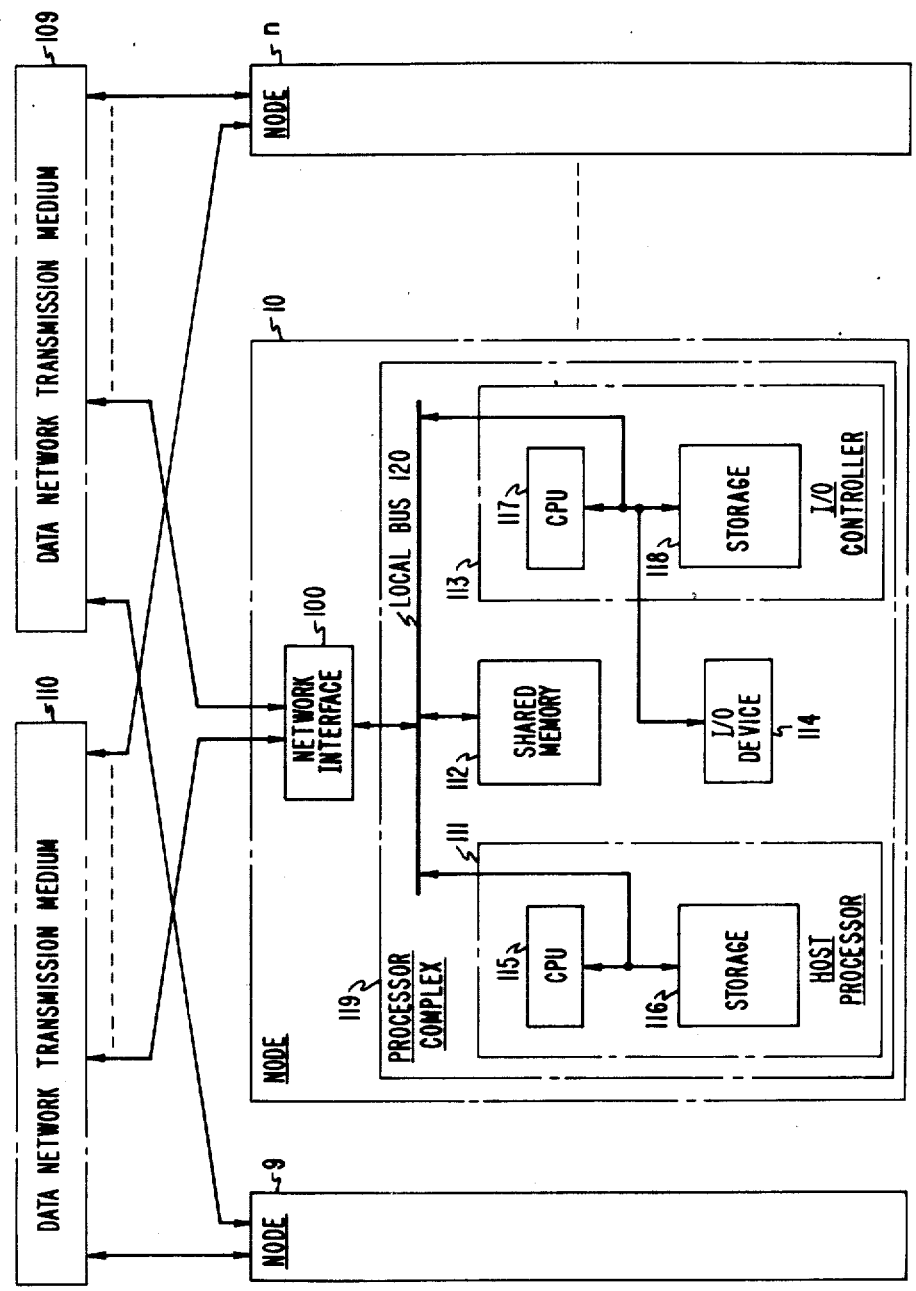
FIG. 1 represents the nodes of a distributed processing system in which the nodes are interconnected by a local data network that uses duplicate data network transmission media.

FIG. 1 shows a distributed processing system in which the processor complexes are interconnected in a local data network, and includes a block diagram of one of the nodes of the network, node 10. Duplicated data network transmission media 109, 110 interconnect all the nodes, i.e., nodes 9, 10, . . . , n, of the local data network. Each of the media may be, for example, a coaxial cable with a tap allowing the attachment of an interface, such as network interface 100 of node 10. In this illustrative embodiment of the invention, connections to each of the network media and the method of resolving contention among nodes for access to the media (carrier sense multiple access/collision detection (CSMA/CD)) are similar to connections and methods described in R. M. Metcalfe et al., U.S. Pat. No. 4,063,220, and subsequently adapted for use in the ETHERNET system of the Xerox Corporation. Other media and contention resolution mechanisms, such as token passing, well known in the prior art, could also be used.

In this illustrative embodiment, data processing tasks are performed in each node. Data is communicated between the nodes via the data network media which are connected to a network interface at each node. In typical node 10, data is transmitted between such a network interface 100 and the rest of the node via local bus 120. Local bus 120 is connected to the processor complex 119 of the node including: a host processor 111 comprising a central processing unit 115 and storage 116; an input/output controller 113 comprising a central processing unit 117 and storage 118 connected to an input/output device 114 such as a terminal, printer, card reader, or data link; and shared memory 112. The input/output controller can also be used for controlling bulk memory devices such as drives for magnetic disks or tapes. Node storage means for the node include storage such as a shared memory 112, host processor storage 116, and input/output controller storage 118. In alternate nodal configurations, the only node storage means could be the storage 116 directly associated with the host processor 111. An alternate processor complex may have only one processor such as host processor 111.

The host processor 111 in this system does not directly control the sending of packets to the data network medium. It communicates various types of requests to the intelligent network interface 100, including requests to send a packet stored in a block of memory in memory 116 of the host processor 111 or in shared memory 112. The network interface communicates responses to these requests, including the response that a requested packet was sent, back to the host processor. The network interface also controls the reception and storage of incoming data packets and notifies the host processor when a data packet has been received. In alternative embodiments, a simpler network interface can be used and the host processor complex can directly control the transmission and reception of packets.

While node 10 is shown with only one host processor and one shared storage, it is possible to have more than one host processor at any node. I/O controllers may be treated as separate host processors if they are capable of action independent of an associated host processor.

The host processors execute basic tasks of the system called program processes, or host processes. In this distributed processing system, different program processes are executed on different processors in different nodes which do not directly access a common memory. The processors in different nodes of this system are interconnected only by the data network media; processes executing on processors in different nodes communicate with each other, not by storing data in a commonly accessible memory, but by sending messages, comprising packets of data, over the data network media.

A major objective of the exemplary distributed processing system of FIG. 1 is to achieve high reliability system performance. In a high reliability distributed processing system, if some module fails, other modules are available to take over its function. In order to achieve high reliability system performance, it is important that a given data processing function not be tied to a given data processing, storage, or input/output module. Flexible assignment of data processing functions can be achieved by the use of logical channels to communicate between processes executing on different processors. Each logical channel is defined by a destination address sent with every packet associated with that logical channel. Each node stores a list of destination addresses associated with that node and is responsive to receive and retain any packet identified with one of these destination addresses. Thus, a given packet, destined for use by a given destination program process, can be routed to whichever node in the system has been assigned to execute the destination program process. Note that in this system, in which each node has access to the data network media, only memory setup operations are required to create a channel, and that no physical path need be specially set up. Hence the term logical channel.

The reliability of the system is further enhanced by the use of dual network transmission media 109, 110 so that failure of either medium will not cause failure of a system. The two network media operate in the active/standby mode. The active medium is used for transmitting all data packets except for the control data packets whose destination is the low level autonomous maintenance access (LLAMA) circuit 170 (FIG. 2), a maintenance microprocessor. The control packets are transmitted from a control node of the system, discussed with respect to FIG. 8. The control packets are transmitted over the standby medium except when the standby medium is out of service, in which case these control packets are also transmitted over the active medium. The use of the LLAMA circuit 170, discussed below with respect to FIG. 2, enhances reliability by allowing for rapid detection of those faults in a node that lead to false transmission of data, and by allowing the standby network medium to be checked without switching it into the active state.

Figure 2:
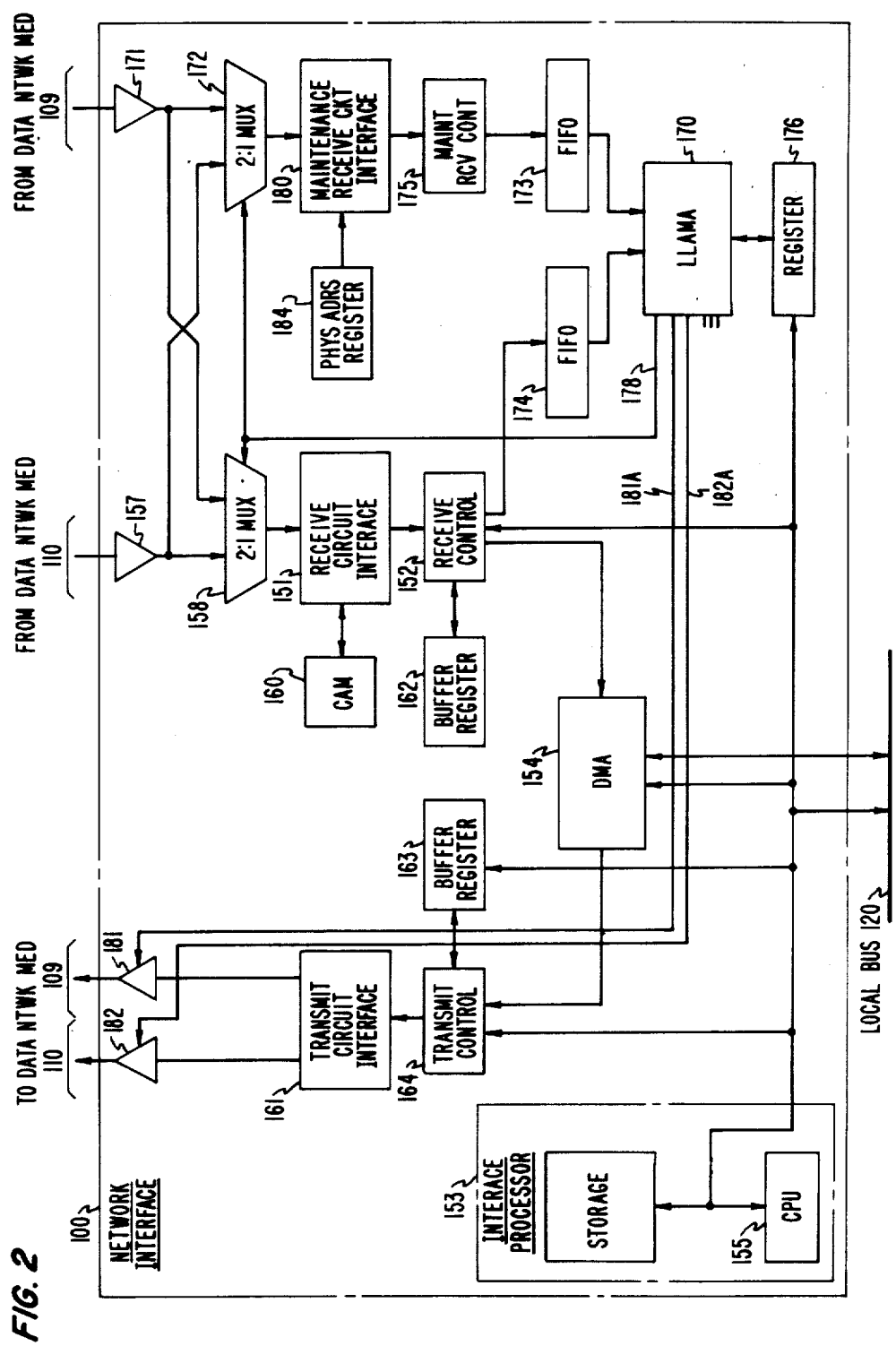
FIG. 2 is a block diagram of a network interface for one node of such a system.

The arrangements for transmission of data packets among nodes will now be briefly described, to be followed by a description of special facilities for reception of control packets by the LLAMA circuit 170. FIG. 2 shows details of the data network interface. One transmit circuit 182 and one receive circuit 157 are connected to data network medium 110. Similarly, one transmit circuit 181 and one receive circuit 171 are connected to the duplicate data network medium 109. Transmit circuit interface block 161 is connected to the data network media 109, 110 via transmitters 181, 182. Transmitters 181 and 182 are also connected to transmit inhibit control signals 181A and 182A connected to and controlled by LLAMA circuit 170. Receive circuit interface block 151 is connected to the data network media 109, 110 via receivers 171, 157 and 2:1 multiplexor 158. The 2:1 multiplexor 158, under the control of output 178 of LLAMA circuit 170, which designates the active data network medium, passes signals only from the active data network medium.

The direct interface circuits in blocks 161 and 151 and maintenance receive circuit interface 180 whose output is used only by LLAMA circuit 170, generate electrical signals to and receive electrical signals from the media. These direct interface circuits are similar to those commercially available for use with the ETHERNET network and handle a number of functions. Transmit circuit interface 161 handles the functions of medium availability detection, collision detection, and, in response to control signals from transmit control 164, backoff and retransmission after collision detection. In addition, in this illustrative system, circuit blocks 161, 180, and 151 perform a number of other functions. They convert straight binary to Manchester coding and vice versa; Manchester coding is used for communicating over the medium as described further below with respect to FIG. 3. They convert from parallel form to serial form for transmission of one word received from transmit control 164 or serial to parallel for reception of one word to be transmitted to receive control 152. They generate or check the cyclic redundancy error check code data, found in every packet in this system, as further described below with respect to FIG. 3. Receive circuit interfaces 151 and 180 also derive clocks from the received electrical signals to sample that signal at the appropriate time. Output signals transmitted to the media are clocked in transmit circuit interface 161 by a system clock (not shown). All of these functions are well known in the art and can be implemented using commercially available integrated circuit components.

Received data packets are stored in buffer register 162 by receive control 152. Buffer register 162 stores the packet data of any received data packet and an initial header including the packet destination address of a packet. Similarly, data packets to be transmitted are stored in buffer register 163. Data is transmitted between node storage and one of the buffer registers 162, 163 via the local bus 120 (connected to node storage), DMA 154, and receive control 152 or transmit control 164. Receive control 152 can simultaneously control the reception of one data packet from one of the network media 109, 110 and the transmission via direct memory access 154 of another data packet to node storage.

Network interface 100 is controlled by a network interface processor 153. The central processing unit (CPU) 155 of network interface processor 153 is a 32-bit microprocessor, a WE ® 32001 processor module manufactured by AT&T Technologies, Incorporated in this exemplary embodiment; other commercially available microprocessors such as the Motorola MC 68000 could also be used. CPU 155 can access receive buffer register 162 via receive control 152 and can access transmit buffer register 163 directly. CPU 155 can set up commands in: the transmit control 164 (e.g.; transmit a packet, load buffer register 163 from the output of direct memory access 154, write a word in buffer register 163); the receive control 152 (e.g., transmit a packet in buffer register 162 to direct memory access 154 for storage in node storage, read a word in buffer register 162, discard a packet in buffer register 162); and the direct memory access 154 (e.g., transmit a block of data received from receive control 152 to local bus 120 for storage in node storage starting at a specified address, transmit a block of data from node storage starting at a specified address to transmit control 164 for storage in buffer register 163). Direct memory access circuits of the type shown in block 154 are well known in the art and are commercially available. Interface processor 153 is also connected to local bus 120 in order to access node storage such as storage 116 associated with host processor 111, and in order to permit node processors such as host processor 111 to access the interface processor's storage 156.

Receive buffer register 162 is 8 kilobytes long and acts like a circular buffer. New packets received from the data network medium are added after previous packets, or are discarded immediately if not destined for this node. Receive control 152 maintains a load pointer for loading newly received packets, and an unload pointer indicating the starting address of packets in the receive buffer register which have not yet been disposed of by the interface processor. When a new packet is received, the load pointer is changed; if the packet is discarded by the receive control because the packet is not destined for this node, the receive control resets the load pointer to the start of that packet. When a packet has been examined by the interface processor 153 and, if necessary, data from the packet has been transmitted to node storage, the packet may be discarded from buffer register 162 and the unload pointer can be changed. If in loading the buffer register 162, data is received which would go beyond the limit indicated by the unload pointer, such data is not stored and an indication of buffer register 162 overflow is made available by receive control 152 to interface processor 153; the interface processor then generates a message to the node which transmitted the packet informing that node that the packet was not correctly received. The interface processor examines previously received packets in order and, after having processed them and/or having caused their data to be stored in node storage, discards a packet by instructing the receive control 152 that the space for the packet may now be made available for new packets arriving from the data network medium; receive control 152 responds by moving up the unload pointer.

As previously mentioned, every data packet includes a destination address. This destination address provides a means for each node to recognize whether a data packet is destined for that node and is used to direct the packet data to an appropriate destination in storage within a destination node. The specific location within such storage is usually in the data space of the destination program process. When a match is detected between the destination address of the packet and one of the list of destination addresses associated with that node, the network interface accepts the data packet and routes it to an appropriate final destination memory within the node. The destination addresses for a node are stored in content addressable memory (CAM) 160, and the check for a match is carried out under the control of receive circuit interface 151.

A receive port is a receiving end of a logical channel. It is set up when memory in the receiving node is properly initialized and when the content addressable memory 160, which stores the destination addresses of packets which are to be examined by the interface processor 153, stores the destination address in a memory location associated with that receive port. In each node, up to 64 receive ports are available, each associated with one of the destination addresses of packets received by a node. The receive port number represents a storage address identification used by the interface processor 153 to select the address in memory where the data of the packet is to be stored.

For control and initialization purposes, each node has one special destination address, called the physical address of that node, used as the destination address of packets directed to the control and maintenance processes of that node, to the interface processor of the node, or to the LLAMA; each node must assign a receive port to the physical address at the time the node is initialized.

Content addressable memory (CAM) 160 is used to store a list of the packet destination addresses associated with data packets which are to be received in a node. Associated with each member of that list is a receive port number. The content addressable memory has internal circuitry for performing a comparison between a search function, the received packet destination address in this case, and a list of values of corresponding data, a list of destination addresses in this case; if a match is found, the content addressable memory reads the output data corresponding to the matched search function, a receive port number in this case. Thus, when the packet destination address of a received packet matches one of the destination addresses stored in content addressable memory 160, the content addressable memory generates the receive port number associated with that destination address. This receive port number is later stored by receive control 152 in buffer register 162 in a position corresponding to a byte of the 8-byte preamble (see discussion of FIG. 3) of a received packet. In this illustrative system, content addressable memory 160 receives the packet destination address directly from receive circuit interface 151, respectively. Content addressable memories are well known in the prior art and are commercially available; a short content addressable memory such as CAM 160 can also be implemented by using a random access memory and rapidly comparing the search function with the contents of each location in the memory.

The content addressable memory 160 is changed relatively infrequently. In this embodiment, the contents of CAM 160 are exchanged by writing data from interface processor 153 into buffer register 163, and then, under the control of transmit control 164, transferring this data to CAM 160. Alternatively, interface processor 153 could have direct access to control addressable memory 160.

The receive port number is used by interface processor 153 to find the address of a block of memory, called a receive buffer, where the packet data of the packet is to be stored. Direct memory access 154 is used to control the transmission of data stored in buffer register 162 via direct memory access 154 and the local bus 120 to storage 116, shared memory 112, or storage 118. Data is passed, one word at a time, from buffer register 162 to direct memory access 154 by receive control 152; the receive control is set up by interface processor 153 to a starting point within buffer register 162 and to the length of the block of data to be transmitted to nodal storage. The direct memory access receives, from interface processor 153, control signals representing the starting address of the receive buffer and an indication of the length of the block. The length of the total data packet was previously generated by receive control circuit 152 which stored this length in buffer register 162 in a position corresponding to another part of the 8-byte preamble of the data packet (see FIG. 3).

The receive circuit arrangement for receiving control data packets for LLAMA 170 will now be described. Control data packets which are destined for the LLAMA are addressed with the physical address of the node. They are normally sent over the standby interconnect medium. They are further identified as being control or maintenance data packets of a type destined for a LLAMA, so that when these packets are sent over the active network medium because standby medium is out of service, they can be appropriately recognized and routed.

Receive circuits 157 and 171 are connected to 2:1 multiplexor 172. Multiplexor 172 is controlled by output 178 of the LLAMA circuit 170 to transmit only the output signal from that receive amplifier 157 or 171 which is connected to the data network medium designated standby by the LLAMA circuit 170. The output of multiplexer 172 is connected to maintenance receive circuit interface 180. The receive circuit interface 180, whose general functions have been described above in the discussion of functions of circuit interfaces 161, 151 and 180, is used for recognizing whether the particular packet being received from the standby data network medium is destined for this node. The maintenance receive circuit interface assembles the portion of a packet which contains the identification of the destination of the packet and compares this with the physical address of this node, stored in a physical address register 184. In this embodiment of the invention, control packets are always addressed to the physical address of a node. The physical address register may be a read only register since the identification of the node can be permanently assigned. If the packet is destined for this node, maintenance receive circuit interface 180 transmits the contents of the packet to maintenance receive control circuit 175 which sends individual bytes of the packet to a FIFO memory 173. The output of the FIFO memory is then read by LLAMA 170. FIFO memory 173 and FIFO memory 174, used for the reception of control packets from the active medium, are conventional first-in first-out stack memories, used, in this case, as buffers between a receive control and the LLAMA. LLAMA communicates with the rest of the network interface and with host processors by a register 176 which is connected to interface processor 153 and to local bus 120 of the processor complex of the node. In an alternative arrangement, two independent signals can be generated to control multiplexors 158 and 172. Using such an arrangement, it would be possible to designate a given transmission medium as both active and standby, and therefore to receive control packets for the LLAMA circuit via multiplexor 172 from the same transmission medium (the active medium) that is used for receiving data packets.

The LLAMA circuit is a conventional processor or microprocessor. In the specific embodiment described herein, the LLAMA circuit is a WE ® 4000 Microcomputer manufactured by AT&T Technologies, Incorporated. The WE 4000 is a simple one chip processor comprising both a central processing unit and a small memory. By concentrating the maintenance control of each node in a very small, hence highly reliable circuit, the reliability of the system is substantially enhanced.

The transmit circuit arrangements will now be described. Transmit circuit interface 161 is connected via transmitters 181 and 182 to the data network media 109 and 110, respectively, and is used to transmit signals on these media representing data stored in buffer register 163. Buffer register 163 is loaded with the data of a data packet to be transmitted on a network medium under the control of transmit control 164; the header of a packet is loaded directly from network interface processor 153 into transmit buffer register 163.

For transmitting data from the node, buffer register 163 is loaded directly by interface processor 153 and, under the control of transmit control 164 and direct memory access 154, via local bus 120 from storage 116, shared memory 112 or storage 118. Transmit control 164 also generates signals to transmit circuit interface 161 to control back-off and retransmission following collision detection. Direct memory access 154 receives the starting address in nodal storage and the length of the block from interface processor 153; transmit control 164 also receives the length of the block from interface processor 153 and always starts loading data from nodal storage at the position just beyond the header of the packet.

Network interface 100 is arranged so that data packets may be simultaneously transmitted and received. This means that one of the destinations of a data packet may be in the source node. This simplifies some of the system software since there is no need to check, whenever messages are to be sent to other processes, whether the receiving process is executed in the source node and to take alternate actions in that case. This facility can also be used by a control node, the source of control packets, described with reference to FIG. 8, to send messages to its own LLAMA circuit.

A data or control packet format 200 capable of conveying the header data required to implement the functions described above, is shown in FIG. 3. For convenience, the value of any 8-bit byte is indicated in this description by the values of two hexadecimal characters, each ranging over the values 0, 1, ..., 9, a, b, c, d, e, and f; for further ease of reading, longer hexadecimal strings are blocked into groups of four characters. A packet consists of a header (fields 201–204), a data field 205, and a check field 206. The header starts with a preamble 201, a group of bits arranged in a standard pattern recognized by each circuit interface 151 as representing the beginning of a packet of data. In this embodiment, the preamble consists of 8 bytes, 5555 5555 5555 55d5. Since the preamble is not needed for further processing of a data or control packet, the storage space of the preamble of a received packet can be used for storing the receive port number and the length of the packet. The preamble is followed by: a six-byte destination address field 202 representing the packet destination address; a six-byte physical address field 203 representing the physical identity (for example, 8000 1000 0009 for node 9) of the source node sending the message; and a miscellaneous control data field 204, described further below with respect to FIG. 7. Then follows an optional packet data field 205. Finally, the packet concludes with a group of check characters in check field 206 representing, in this embodiment, check sums for a cyclic redundancy code; these are generated by transmit circuit interface 161 and verified upon reception by receive circuit interface 151 or maintenance receive circuit interface 180 to see if the message has been received correctly.

It is not necessary to indicate the size of the packet in the system in accordance with this invention. The end of the packet is recognized by the fact that no more message bits are on the data network medium; the absence of data is detectable if, as in this system, Manchester coding (0=01, 1=10, absence of data=00 ... 0) is used to represent data transmitted over the data network medium. One of the functions of the receive circuit interfaces 151 and 180 or of transmit circuit interface 161 (FIG. 2) is to decode or generate, respectively, Manchester code representations of data to be stored in or transmitted from buffer registers or FIFOs in the network interface. Other known coding schemes could also be used.

FIGS. 4 and 5 show the address spectrum of the destination addresses, and the layout of the content addressable memory 160 used to store such destination addresses. The destination address is a 6-byte (48 bit) quantity, shown for convenience in hexadecimal form. Range 224, the specific destination address comprising all ones, is reserved for broadcast messages destined for all nodes which are initialized to receive such broadcast messages. While in this embodiment, the broadcast address is not used for control packets, in alternative embodiments, the broadcast address as well as the physical address, could be used for control packets; this would permit the use of broadcast control packets, for example, to switch media in all nodes simultaneously. Range 221, consisting of those addresses from 0100 0000 0000 to 7fff ffff ffff having a 1 in the lowest bit position of the first byte, and range 222, consisting of those addresses from 8100 0000 0000 to ffff ffff fffe having a 1 in the lowest bit position of the first byte, are available for the assignment of general purpose logical channels. An initial 3-byte quantity having a zero in the lowest bit position of the first byte, identifies a block of physical addresses dedicated to one manufacturer. This quantity is shown as 8000 10 in the present embodiment. Addresses in range 223 from 8000 1000 0000 to 8000 10ff ffff are available to represent physical addresses of nodes, and are used to identify packet destinations or sources representing the physical address of a node instead of that of a logical channel associated with a general process executing on a node. Physical addresses are also used as destination addresses for control packets destined for a LLAMA circuit. Source addresses usually represent the physical address of the source node and are used to generate acknowledgement messages (not described). The conventions for packet destination addresses used in this embodiment are designed to be compatible with the conventions used in the ETHERNET system.

The addresses in block 390 of the content addressable memory represent the destination addresses associated with the 64 receive ports to which this node is responsive. As previously indicated, the destination address of every packet on the data network medium is compared with the contents of the content addressable memory 160 to see whether that packet is to be received by this node. Receive port 0 is usually reserved for broadcast messages associated with the broadcast destination address ffff ffff ffff; therefore the contents of location 391, corresponding to receive port 0, are normally hexadecimal ffff ffff ffff. Location 392 contains the number of a receive port number, 0 in this case, corresponding to location 391. Receive port 1 is normally associated with the physical address of the node. Therefore, the contents of location 393 of node 10 (ten) are hexadecimal 8000 1000 000a. (000a is hexadecimal ten.) The contents of physical address register 184, used in connection with messages received from the standby data network medium, are also the physical address of the associated node. The contents of memory locations 395, ..., 397 are the packet destination addresses associated with receive ports 2, ..., 63, respectively.

As an early step in overall system initialization, each processor must be made capable of accepting instructions from some overall control node. In order to listen for messages on the interconnection medium, each node must open a receive port. In order to be able to receive initialization, control, and maintenance messages and messages requesting the opening of a receive port, it is convenient for each node to open a receive port associated with its own physical address (within range 223 of FIG. 4) to be used for messages to the control system of a node. When this receive port has been opened, the node is presented to accept messages to the physical address of that node. Initial messages from a system initialization process in a control node of the system to a node initialization process in each node are used to selectively open a set of receive ports to allow each node to communicate with other nodes, and to initiate the execution of the basic program processes assigned to each node.

FIG. 6 shows in detail the input/output connections of LLAMA circuit 170. LLAMA circuit 170 receives input data from the maintenance receive control 175 via FIFO 173. In case the standby data network medium is out of service, LLAMA circuit 170 can also receive inputs from the receive control 152 via FIFO 174. LLAMA 170 interprets and processes its input data, and generates output signals 181A and 182A which directly affect transmit drivers 181 and 182 by inhibiting the output of one or both of these transmit drivers. Both transmit drivers are inhibited if there is a trouble condition in the node causing false data packets to be generated for transmission on the active data network medium. LLAMA 170 also generates control signal 178 to the two 2:1 multiplexors 158 and 172 directing one to accept the input from data network medium 110 via amplifier 157, and directing the other to accept the input from data network medium 109 via amplifier 171. The output of multiplexor 158 represents the signals from the active data network medium while the output of multiplexor 172 represents the signals from the standby data network medium. When the standby data network medium is out of service, data packets sent to the LLAMA over the active data network medium are recognized by the receive control 152 because of indications in the packet type and maintenance packet type fields of a received message, as discussed below with respect to FIG. 7; these data packets are sent to LLAMA circuit 170 via FIFO (FIG. 2).

LLAMA circuit 170 also communicates with the network interface processor 153. It does so by two leads, one a reset lead to reset the state control elements of the CPU 155 so that the CPU goes to a standard initial state and the other an interrupt lead to cause the CPU to go to a predetermined program. The predetermined program gets further data from the LLAMA circuit via register 176 which accepts outputs of data from the LLAMA circuit. The output of register 176 is read by interface processor 153. The LLAMA circuit also has an output which is used to interrupt host processor 111. When this interrupt is used, host processor 111 similarly reads the output of register 176 via local bus 120. In alternative embodiments, only one of the processors 153 or 111 need be interrupted.

FIG. 7 shows a layout of miscellaneous field 204 of a received data or control packet 200. The field consists of six bytes. The first byte 211 defines the type of packet; one of the types is the maintenance type. The second byte 212 defines the type of maintenance packet and is used only if the packet type indicates a maintenance type. Field 212 is further broken down into an initial bit 216 which is an indicator of whether the message is destined for the LLAMA and a 7-bit maintenance action field 217 which defines the type of maintenance action requested. Control packets have type maintenance and destination LLAMA. Byte 213 defines the reliability level of the packet. In this system, arrangements have been made to allow different kinds of checks to be made for packets of varying reliability levels. For the lowest level, acknowledgement of packets is not required and only the cyclic redundancy check is performed; for the highest reliability level, acknowledgements are required and each packet of a multi-packet message has an associated sequence number so that a receiver can ensure that the packets of a multi-packet message are received in the correct order and without any missing packets. Byte 214 represents the sequence number for a high reliability level packet. Finally, two bytes in field 215, indicated as miscellaneous data, are used for purposes unconnected with the present invention.

FIG. 8 is a list of types of requests sent to a LLAMA circuit. The commands are contained in a control packet. Control packets are sent to a LLAMA circuit from one of the nodes of the distributed processing system, designated a control node. This node has the responsibility of insuring the overall performance of the data network making certain that all nodes are properly responding to messages switching out defective nodes and reassigning the tasks performed by these defective nodes. The first type of request, a reset request, is used to reset the state control elements of the interface processor CPU 155 (FIG. 2) in order to reinitialize the interface processor 153 and, thereby, if necessary, other elements of the node. The connect order allows the LLAMA circuit to enable the one of the transmit amplifiers 181 or 182 connected to the active network medium, and thereby allows the node to transmit on that medium. The isolate order inhibits transmission to both network media. The two switch instructions request the LLAMA to connect the node to one of the two media, in effect, defining the active network medium for that node.

A diagnose command requests the LLAMA circuit to ask the interface processor 153 (FIG. 2) to diagnose the network interface and report results to the control node. This is done via an interrupt to the interface processor CPU 155 (FIG. 2), followed by a reading of a data word from register 176, representing the specific command to interface processor 153. A low level LLAMA circuit sanity check command requests the LLAMA circuit to perform a simple internal sanity check and to report to the control node the result of this sanity check. After the LLAMA circuit has performed the sanity check, it interrupts the interface processor CPU 155, and reports a result in register 176 to interface processor 153. The result of the sanity check is reported to the control node under the control of interface processor 153 via the active network medium. If the result of the sanity check is negative, the control node will first try to isolate the node by sending an isolate order. If this attempt is unsuccessful, the control node will send a command over the active network medium to the interface processor 153 requesting that the associated node stop transmitting data packets because of the fault. Two interrupt commands are also available, one to interrupt the network interface processor 153, the other to interrupt host processor 111. After such an interrupt is generated, the interrupted processor reads the contents of output register 176, previously loaded by the LLAMA circuit, to identify the particular program to be executed by that processor.

The control node is similar in structure to other nodes such as node 10. For the purposes of this part of the description, it will be assumed that node 10 is the control node. In order to enhance reliability, at least one other node should be equipped to assume the role of control node if necessary. The program for controlling the control functions of the control node resides in the host processor 111. The control node monitors the performance of the complete distributed processing system. Periodically, the control node polls all the other nodes to check whether they are capable of responding to a simple message. The control node further sends control packets to the LLAMA circuits of other nodes and of the control node itself by transmitting such packets over the standby data network medium. The control node is able to send control packets over the standby data network medium by causing the LLAMA circuit of the control node to switch transmission to the standby data network medium. It does so by communicating with the LLAMA circuit via register 176, accessible to the host processor 111 via local bus 120. In this way, host processor 111, can send an instruction to the LLAMA circuit, and the LLAMA circuit can then switch the control node to transmitting on the standby data network medium without changing the reception facilities of the control node. After the control packet has been sent on the standby data network medium, the control node returns to the normal mode in which it is both transmitting on and receiving from the active network medium. Again, this is accomplished by sending another instruction from the host processor 111 of the control node to the LLAMA circuit 170 of that node.

For any of the cases in which the control node receives messages indicating trouble, or fails to receive messages thus indicating lack of response to a request, the control node raises an alarm to indicate that maintenance action on one of the nodes is required.

A node can be added to a working system, or a previously defective node can be restored to service safely, by first connecting that node to the standby network medium, and temporarily associating a testing control node with the standby network medium. Messages can then be exchanged between the testing control node and the node being tested over the standby network medium acting, for the purposes of the node being tested, as if it were the active network medium. Test messages can also be sent over the other network medium to the LLAMA circuit of the node being tested. If the tests are successful, the node can be switched to normal service by being switched to the active network medium. The testing can be performed without risking the integrity of the rest of the distributed processing system.

It is to be understood that the above-described embodiment is merely illustrative of the principles of this invention; other arrangements may be devised by those skilled in the art without departing from the spirit and scope of the invention.

What is claimed is:

1. In a distributed processing system comprising a plurality of processor complexes, each complex comprising at least one processor, means for transmitting data packets among said processor complexed comprising:
  two local data network transmission media; and
  a network interface uniquely associated with and connected to each of said processor complexes and connected to both of said transmission media for conveying operational data packets between the associated processor complex and one of said transmission media and comprising a maintenance processor for receiving control data packets from the other of said transmission media and responsive to received control data packets for controlling maintenance operations of said network interface.

2. In a distributed processing system comprising a plurality of processor complexes, each complex comprising at least one processor, means for transmitting data packets among said processor complexes comprising:
  two local data network transmission media; and
  a network interface uniquely associated with and connected to each of said processor complexes and connected to both of said transmission media for conveying operational data packets between the associated processor complex and one of said transmission media and for receiving control data packets from the other of said transmission media, wherein said network interface comprises a maintenance processor responsive to said control data packets for selecting said one and said other of said transmission media.

3. A network interface for use in a distributed processing system, said distributed processing system comprising two local data network transmission media and a plurality of processor complexes, each complex comprising at least one processor, said network interface associated with and connected to one processor complex and connected to both of said transmission media, one of said transmission media being designated active and one of said transmission media being designated standby, for transmitting data packets between said one processor complex and said media, comprising:
  a maintenance processor for receiving control packets from the one of said transmission media designated standby and, responsive to receipt of said control packets, for changing the designation of one of said transmission media to active and changing the designation of one of said transmission media to standby; and
  means for conveying data packets between said one processor complex and the one of said transmission media designated active by said maintanence processor.

4. The network interface of claim 3 in which said maintenance processor comprises means for generating output control signals to control said means for conveying data packets to transmit to no more than one of said two transmission media.

5. The network interface of claim 4 in which said means for generating said output control signals is further adapted to control said means for conveying data packets to transmit to neither of said two transmission media.

6. The network interface of claim 4 in which said maintenance processor is further responsive to said control packets, received from the one of said transmission media designated standby, to generate said output control signals.

7. In a distributed processing system, comprising a plurality of processor complexes and data communication means interconnecting said processor complexes, a method of communicating data between a first and a second of said processor complexes, comprising the steps of:
  providing two local data network transmission media as part of said data communication means;
  designating one of said transmission media as active and the other of said transmission media as standby
  transmitting data packets from said first processor complex over said active transmission medium;
  receiving said data packets in said second processor complex from said active transmission medium;

transmitting control packets from said second processor complex over said standby transmission medium; and receiving said control packets in said first processor complex from said standby transmission medium.

8. The method of communicating data of claim 7 in which said step of receiving said control packets further comprises the steps of:

generating an interrupt signal to said first processor complex.

9. The method of communicating data of claim 7, further comprising the step of:

responsive to reception of said control packets in said first processor complex, changing the designation of said one transmission medium to standby and the designation of said other transmission medium to active.

10. In a distributed processing system comprising a plurality of processor complexes, each complex comprising at least one processor, means for transmitting data packets among said processor complexes comprising:

two local data network transmission media; and a network interface uniquely associated with and connected to each of said processor complexes and connected to both of said transmission media, comprising a maintenance processor for designating one of said transmission media active, for designating one of said transmission media standby, and means for conveying data packets between the associated processor complex and the one of said transmission media designated active by said maintenance processor.

11. The distributed processing system of claim 10 in which said maintenance processor comprises means for generating output control signals to control said means for conveying data packets to transmit to no more than one of said two transmission media.

12. The distributed processing system of claim 11 in which said means for generating said output control signals is further adapted to control said means for conveying data packets to transmit to neither of said two transmission media.

13. The distributed processing system of claim 12 in which said maintenance processor is further adapted to designate one of said transmission media as standby, and is responsive to control packets, received from the one of said transmission media designated standby, to generate said output control signals.

14. The distributed processing system of claim 11 in which said maintenance processor is responsive to control packets, received from the one of said transmission media designated standby, to generate said output control signals.

15. The distributed processing system of claim 10 in which said maintenance processor is further adapted to receive control packets from the one of said transmission media designated as standby by said maintenance processor.

16. The distributed processing system of claim 15 in which one of said plurality of processor complexes and its associated network interface is designated a control node, and in which said control node is operative under program control to generate and transmit said control packets on the one of said transmission media designated standby by the maintenance processor of said control node.

17. The distributed processing system of claim 16, in which the network interface of said control node is responsive to data received from a processor of the processor complex of said control node to convey said control packets from said processor complex of said control node to the one of said transmission media designated standby by the maintenance processor of said control node.

18. The distributed processing system of claim 15 in which said network interface further comprises means for receiving said control packets from the one of said transmission media designated active by said maintenance processor and transmitting said control packets to said maintenance processor.

19. The distributed processing system of claim 10 in which one of said plurality of processor complexes and its associated network interface is designated a control node, and in which said control node is operative under program control to transmit control packets on the one of said transmission media designated standby by the maintenance processor of said control node.

20. The distributed processing system of claim 19, in which the network interface of said control node is responsive to data received from a processor of the processor complex of said control node to convey said control packets from said processor complex of said control node to the one of said transmission media designated standby by the maintenance processor of said control node.

21. The distributed processing system of claim 10 in which said network interface further comprises an interface processor for controlling said means for conveying data.

22. The distributed processing system of claim 21 in which said maintenance processor is responsive to a control packet received over said one of said transmission media designated as standby to generate an interrupt signal to said interface processor.

23. The distributed processing system of claim 22 in which said maintenance processor is further adapted to generate data signals, and in which said interface processor is responsive to said interrupt signal and said data signals to initiate a program identified by said data signals.

24. The distributed processing system of claim 10 in which said maintenance processor is responsive to a control packet received over said one of said transmission media designated as standby to generate an interrupt signal to one of the processors of the processor complex associated with said network interface.

25. The distributed processing system of claim 24 in which said maintenance processor is further adapted to generate data signals, and in which said one of the processors of the processor complex associated with said network interface is responsive to said interrupt signal and said data signals to initiate a program identified by said data signals.

26. The distributed processing system of claim 10 wherein said maintenance processor is further responsive to data signals received from said associated processor complex to initiate execution of a program.

27. The distributed processing system of claim 10 wherein said network interface comprises an interface processor for controlling said means for conveying data.

28. The distributed processing system of claim 27 wherein said maintenance processor is further responsive to data signals received from said interface processor to initiate execution of a program.

* * * * *

UNITED STATES PATENT AND TRADEMARK OFFICE
CERTIFICATE OF CORRECTION

PATENT NO. : 4,692,918

DATED : September 8, 1987

INVENTOR(S) : Roger A. Elliott, Wayne V. Lindquist

It is certified that error appears in the above-identified patent and that said Letters Patent is hereby corrected as shown below:

Column 13, line 56, change "complexed" to --complexes--.

Column 14, line 64, after "standby" insert a semicolon.

Signed and Sealed this

Twenty-eighth Day of June, 1988

*Attest:*

DONALD J. QUIGG

*Attesting Officer*     *Commissioner of Patents and Trademarks*